E. BLACKMAN.

Assignor of one-half Interest to A. H. BYINGTON.

LAMP-CHIMNEY.

No. 7,417. Reissued Dec. 5, 1876.

Witnesses:
Will H. Dodge
Donn J. Turtchell

Inventor:
E. Blackman
by Dodgerson
Attys.

THE GRAPHIC CO. N.Y.

UNITED STATES PATENT OFFICE.

EBENEZER BLACKMAN, OF NEW YORK, N. Y., ASSIGNOR OF ONE-HALF INTEREST TO A. HOMER BYINGTON, OF NORWALK, CONNECTICUT.

IMPROVEMENT IN LAMP-CHIMNEYS.

Specification forming part of Letters Patent No. 123,325, dated February 6, 1872; reissue No. 7,417, dated December 5, 1876; application filed November 16, 1876.

DIVISION A.

*To all whom it may concern:*

Be it known that I, EBENEZER BLACKMAN, of New York, in the county of New York and State of New York, have invented certain new and useful Improvements in Bases or Supports for Lamp-Chimneys; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

This invention consists of a glass base for coal-oil burners, so constructed as to fit on a lamp or burner in a manner similar to ordinary glass chimneys, and having a laterally-projecting flange or rim to support a chimney or reflector; also, in the combination of said base with a coal-oil burner, and also the combination of said base with the burner and a chimney or reflector, as hereinafter more fully explained.

Figure 1:
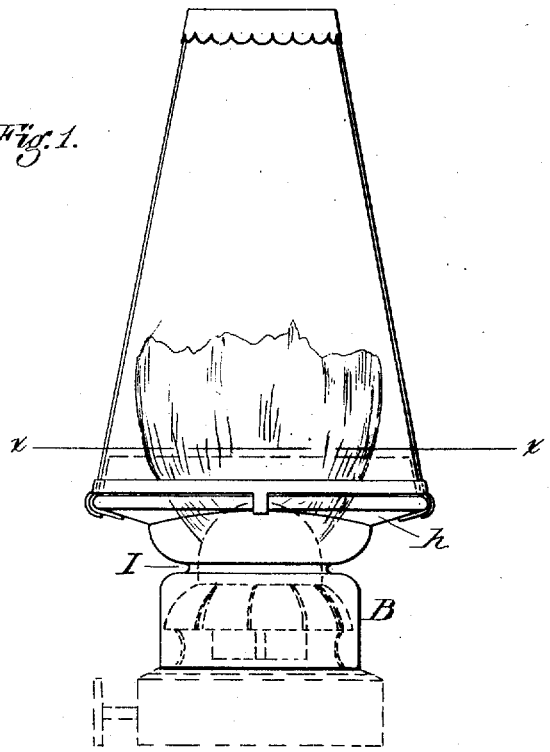
Figure 2:
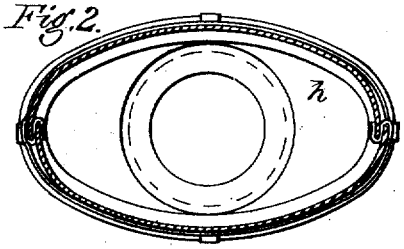
Figure 3:
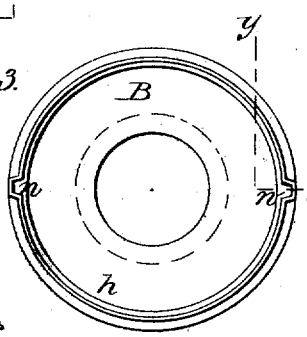
Figure 4:
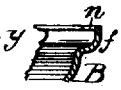
Figure 5:
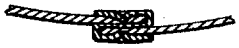
Figure 6:
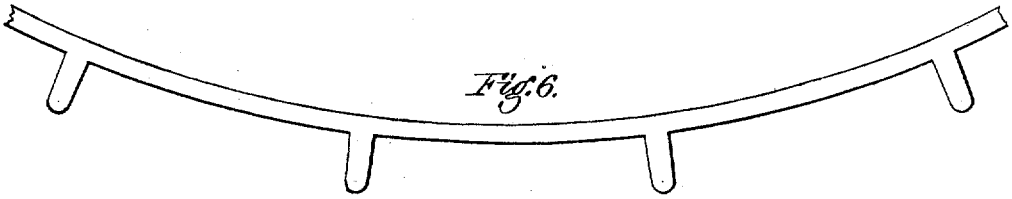

Figure 1 is a side elevation, showing the base with a chimney applied to a burner or lamp. Fig. 3 is a top-plan view of the glass base having its lateral flange of an oval form, and Fig. 3 is a similar view of the base with the flange made of a circular form; and Fig. 4 is a section on the line *y y* of Fig. 3, the remaining figures (5 and 6) being details of a chimney, which will form the subject of a separate application, and need not, therefore, be further described herein.

The glass base or support B is made with a tubular body of the requisite size to fit over a lamp-burner, in the manner shown in Fig. 1. I prefer, also, to make it with an annular contraction, I, as shown, for the purpose of deflecting the current of air which passes up within the body inward upon the flame at its base, thereby more effectually supplying the oxygen of the air to support combustion. By this plan the air which is drawn up through the tubular portion of the base keeps it cool, so it can be easily handled, and also prevents it from being cracked or broken by the heat. Above the contraction I, or at its upper end, the tubular body is provided with a laterally-projecting flange, *h*, to serve as a support or holder for the chimney or reflector, it being made of a size to fit the chimney. This flange *h*, at its periphery, is also provided with an upwardly-projecting lip, which serves to hold the chimney or reflector in place. I prefer to make this lip with an inward curve at its upper edge, as shown, thereby forming a groove, as shown at *f*, Fig. 4, with openings or notches *n*, into which projections on the chimney may fit, when, by turning the latter, the projections will lock under the inwardly-projecting edge of the lip, thus holding it securely in place.

It is obvious that the lip may be made without the notches and the inward curve, and the chimney be secured to the base by metal clips, or in any other manner desired. In making these bases I prefer, also, to make the part directly above the contraction I of saucer form, as shown in Fig. 1, though if the contraction be omitted this saucer-shaped portion may be omitted also, in which case the tubular portion will be extended straight up to the point where it joins the flange *h*, of uniform size, or nearly so.

By making the base of glass the light is readily transmitted through it, and there is no shadow around the lamp, as there would be were the base made of metal.

While I have shown a peculiarly-constructed chimney as adapted for use in connection with my base, it is obvious other kinds or styles may be used, if preferred.

I am aware that a patent was granted to W. Fullager, June 7, 1870, in which is shown a porcelain base constructed and intended to be used with a gas-burner; but said device will not answer the purpose for which my base is designed—first, because, being made of porcelain, it will not permit the light to shine through it, as my transparent base does; and, second, because it has not such a tubular body as is required to support it on a coal-oil lamp and direct the currents of air to the flame, without which it cannot be used with a coal-oil burner, and I therefore do not claim such a device; but,

Having thus described my invention, what is herein claimed as my invention is—

1. A glass base for coal-oil burners, constructed with a tubular body to fit around the cone or burner, and having a laterally-projecting flange, substantially as and for the purpose set forth.

2. A glass base having the contraction I and the laterally-projecting flange *h*, substantially as described.

3. The glass base provided with the internal groove *f* and the notches *n*, for locking a chimney thereon, as set forth.

4. A transparent base for a coal-oil-lamp chimney, having a tubular body of suitable form and length to fit and support it on the lamp, and having a laterally-projecting flange, *h*, substantially as described.

5. The combination of a transparent base, having the tubular body B of suitable form and length to adapt it to be used on a coal-oil lamp, and a laterally-projecting flange, *h*, with a chimney, substantially as described.

6. The combination of the transparent base or holder B, provided with the downwardly-extending socket or body and dish-shaped flange, with the cone of a coal-oil lamp or burner, substantially as set forth.

EBENEZER BLACKMAN.

Witnesses:

ALLEN I. MEEKER,
EDWARD P. WEED.